United States Patent [19]

Williams

[11] Patent Number: 4,991,715
[45] Date of Patent: Feb. 12, 1991

[54] BICYCLE TRANSPORT CASE

[76] Inventor: Robert F. Williams, 3027 Swandale, San Antonio, Tex. 78230

[21] Appl. No.: 398,628

[22] Filed: Aug. 25, 1989

[51] Int. Cl.⁵ .............................................. B65D 85/68
[52] U.S. Cl. .................................... 206/335; 206/577
[58] Field of Search ........................ 206/335; 190/107; 224/42.03 B

[56] References Cited

U.S. PATENT DOCUMENTS 4,756,416 7/1988 Johnson ................................ 206/335
4,792,039 12/1988 Dayton ................................. 206/335

Primary Examiner—Joseph Man-Fu Moy
Attorney, Agent, or Firm—Baker & Botts

[57] ABSTRACT

A case for containing and protecting a bicycle during transport generally comprising a base with a front and a rear mount for attachtment to front and rear portions of the bicycle respectively. A flexible cover contains the bicycle with the case. The case may be made adjustable for different bicycle sizes by slidably engaging one of the mounts on said base. Various embodiments of the case provide a frame for protecting the gears of the bicycle and provide a wheel pad for wrapping and storing the wheels of the bicycle.

19 Claims, 3 Drawing Sheets

BICYCLE TRANSPORT CASE

TECHNICAL FIELD OF THE INVENTION

This invention generally relates to a bicycle transport case, and more particularly to a lightweight and compact transport case, which is adjustable in accordance with the size of the bicycle and which requires minimal dismantlement of the bicycle.

BACKGROUND OF THE INVENTION

In recent years, bicycling has become a popular way for keeping physically fit. Many individuals, preferring to avoid the inconvenience and danger of cycling in congested urban areas, transport their bicycles to a desired cycling locale. Also, with the increasing popularity of cycling competitions, national and international cycling events have increased the opportunities for travel with a bicycle. Consequently, there is a need for a bicycle transport case capable of protecting the bicycle during transport. Additionally, to minimize the inconvenience of transportation, it is desirable to have a case that is compact and lightweight.

In addition to increased transport of bicycles, another change in bicycle use has been the use of more sophisticated and delicate gear systems. These systems need to be protected during transport, but without unduly adding weight and bulk to the case.

In the past, bicycle carrying cases have been developed that are relatively bulky and require extensive dismantlement of the bicycle. For example, in Bentler, U.S. Pat. No. 4,353,464, a hard-shelled container for the storage and transportation of a bicycle is disclosed. A disadvantage of the invention is that it requires that the pedals be detached, as well as the wheels and other components of the bicycle. Also, even though the case provides a protective cover over the bicycle, the material of the cover is a bulky plastic, which increases the size and weight of the case. Other examples of hard-shelled cases are Profeta, U.S. Pat. No. 4,378,883, and Bender, U.S. Pat. No. 4,390,088, both of which teach extensive dismantlement of the bicycle.

A case made from a flexible material is disclosed in Garrett, et al., U.S. Pat. No. 3,886,988. A disadvantage of Garrett, however, is that the soft-shelled design of the invention promotes lightweight at the expense of protection of the bicycle from the stress of travel. In particular, the case does not protect the bicycle gears. Another disadvantage of the invention is that the handlebars and the seat must be dismantled before placing the bicycle in the case. Other soft-shelled cases on the market have similar disadvantages and none has mounts to secure the bicycle that are adjustable according to the length of the bicycle frame.

A need has therefore arisen for a bicycle transport case that is lightweight and that protects the bicycle. Additionally, there is a need for a case that requires minimal dismantlement of the bicycle and that permits easy assembly and disassembly of the bicycle by the user when using the case.

SUMMARY OF THE INVENTION

One aspect of the invention is a bicycle transport case having a front mount and a rear mount, attached to a base, for securing the bicycle within the case, which are adjustable according to the length of the bicycle. To this end, at least one mount is slidably engaged with the base, by means of a sliding connector for varying the distance between the front and the rear mounts. Alternatively, at least one of the mounts is angled with respect to the base and is rotatably attached to the base so that this angle may be varied.

Another aspect of the invention is a bicycle transport case that is compact. To this end, the case is designed to carry a bicycle having at least one wheel removed. A front mount and a rear mount are attached to a base. These mounts provide means for attachment to the front and the rear portions of the bicycle, and more particularly, at least one of the mounts provides a means for attachment to the bicycle where the removed wheel would otherwise be attached. This manner of attachment lends itself to the use of quick release assemblies.

Another aspect of the invention is a bicycle transport case for protecting the bicycle from damaging forces that would otherwise cause stress on the bicycle during transport. The case has front and rear mounts for attachment to the front and rear portions of the bicycle, as well as a frame for protecting the rear portion of the bicycle, especially the bicycle gears.

An additional feature of the invention is a wheel pad to protect the wheels during transportation, the wheels having been first removed from the bicycle. This wheel pad is designed to be placed within the case in a manner that further serves to protect the bicycle itself.

Another feature of the invention is an optional handlebar stem that permits the case to be used with bicycles having nonstandard handlebars and avoids the need to rotate the handlebars of a standard bicycle. Another feature of the invention is incorporation of shock absorption means within the mounts.

The invention has technical advantages over prior bicycle transport cases because it protects the bicycle during transport, minimizes the dismantlement prior to transport, adjusts according to the size of the bicycle, and is lightweight and compact.

DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

Figure 1:
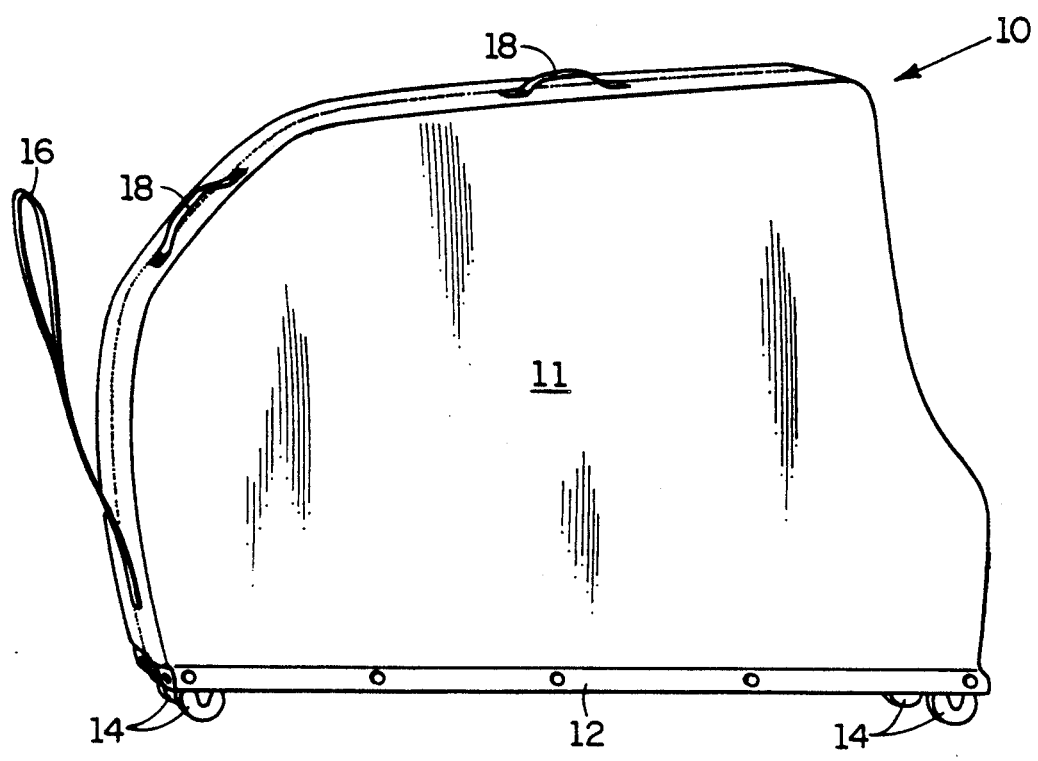
FIG. 1 is a perspective view of the invention, with the cover closed over the bicycle.

FIG. 1 is a perspective view of the invention, generally designated as case 10. Case 10 has a base 12 and a cover 11 connected to base 12. In the preferred embodiment, cover 11 is made from a flexible, lightweight material, such as a woven synthetic or canvas. Cover 11 envelopes a bicycle (not shown) inside case 10, preferably by means of two sections which join along a zippered opening.

A plurality of wheels 14 are attached to base 12, and permit mobility of case 10. A strap 16 is connected to cover 11 for pulling case 10. A plurality of handles 18 may also be attached to case 10 for purposes of lifting or pulling case 10.

Figure 2:
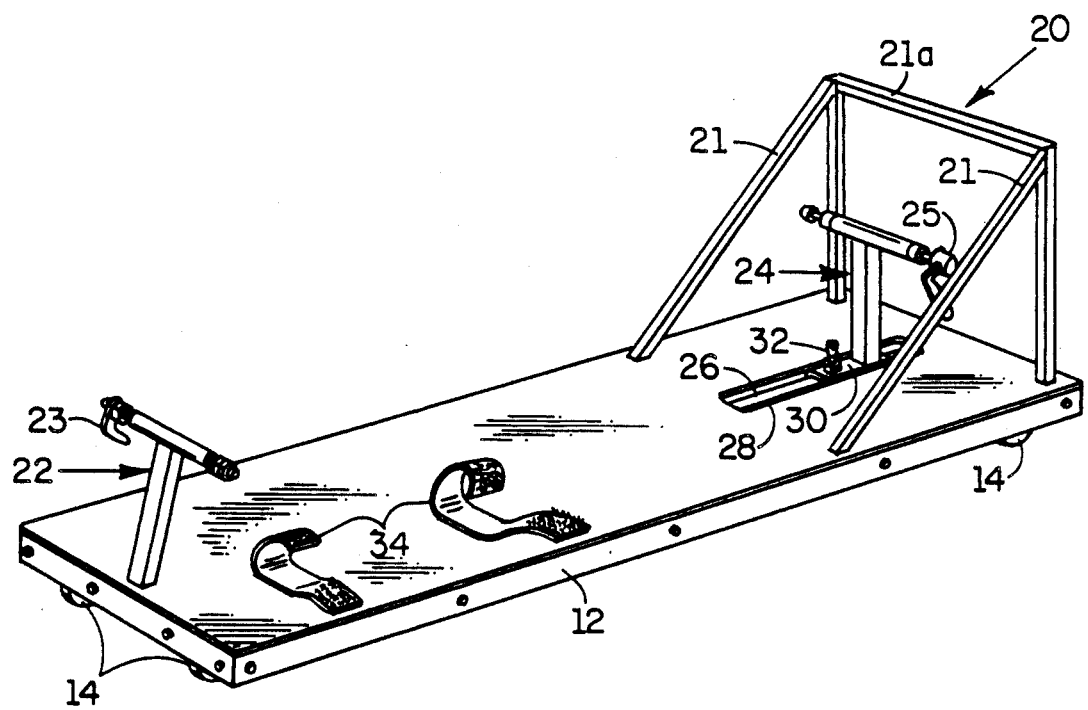
FIG. 2 is a perspective view of a portion of the invention, i.e., the base, the mounts, and the frame.

FIG. 2 is a perspective view of base 12 without cover 11. Base 12 is rectangular in shape, having a length that is approximately equal to the longer end of a range of lengths of bicycle frames. The width of base 12 is slightly less than the widest width of standard bicycle handlebars.

Figure 3:
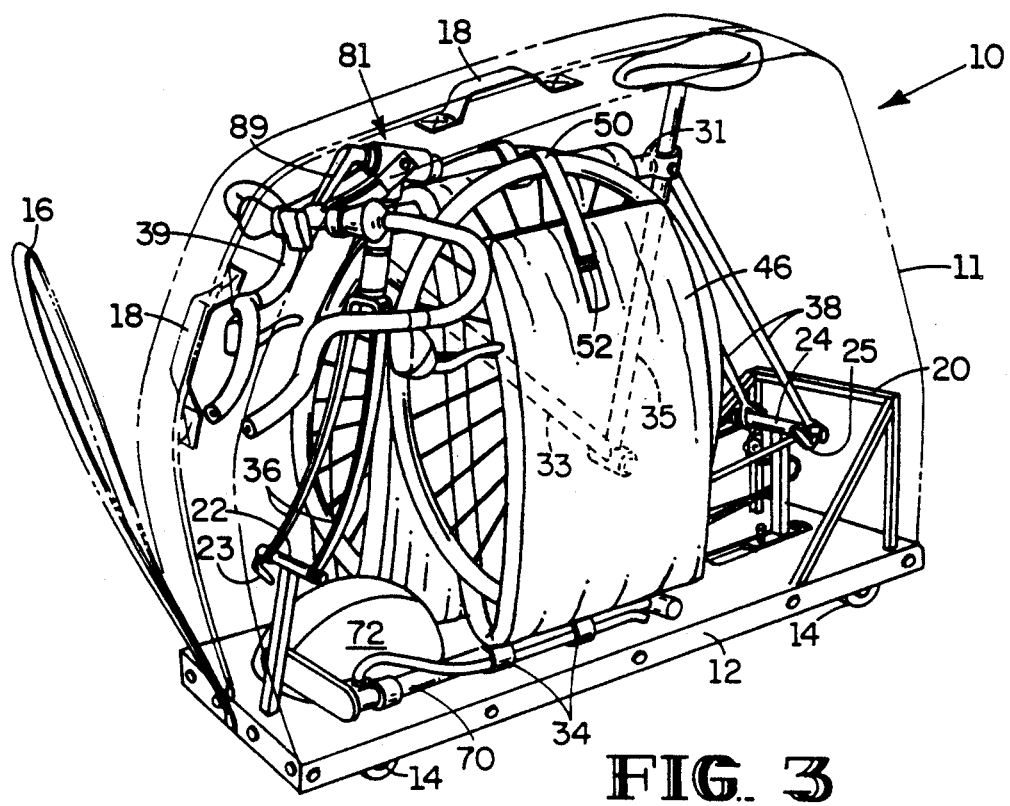
FIG. 3 is a perspective view of a bicycle secured within the invention.

FIG. 2 shows two basic components of the invention, front mount 22 and rear mount 24, which are the means for securing the bicycle within the case 10. In the preferred embodiment of the invention, case 10 is used to carry a bicycle having both wheels removed. Thus, as explained below, both front and rear mounts 22 and 24 are designed for attachment to the front forks 36 and the rear drop outs 38 of a bicycle, as illustrated in FIG. 3. Yet, an important feature of the invention, explained below, is the adjustability of front mount 22 and rear mount 24 to accommodate various sizes of bicycles. This feature of the invention is believed novel regardless of whether the bicycle wheels are removed and some other manner of attaching front mount 22 and rear mount 24 to the bicycle is used.

Front mount 22 is connected to the front of base 12. In the preferred embodiment, front mount 22 is designed for attachment to the front fork 36 of a bicycle, as shown in FIG. 3. Thus, in the preferred embodiment, front mount 22 has a t-shape and the cross portion of front mount 22 may be conveniently attached to the bicycle where the front wheel would otherwise be located. This preferred design lends itself to the use of quick release mechanisms 23, such as are commonly used to attach bicycle wheels to bicycle frames. Nevertheless, the attachment of front mount 22 to front fork 36 is not a necessary feature of the invention, and front mount 22 may be attached to other parts of the front portion of the bicycle. Nor is it necessary that the front wheel be removed. For example, front mount 22 could be attached to the down tube 37 shown in FIG. 3.

Rear mount 24 is connected to the rear of base 12. In the preferred embodiment, rear mount 24 is designed for attachment to the rear drop outs 38 of a bicycle, as shown in FIG. 3. Thus, in the preferred embodiment, rear mount 24 has a t-shape and the cross portion of rear mount 24 may be conveniently attached to the bicycle where the rear wheel would otherwise be located. As with front mount 22, this preferred design lends itself to the use of quick release mechanisms 23. Nevertheless, the attachment of rear mount 24 to rear drop outs 38 is not a necessary feature of the invention, and rear mount 24 may be attached to other parts of the rear portion of the bicycle. Nor is it necessary that the rear wheel be removed. For example, rear mount 24 could be attached to the seat tube 41 shown in FIG. 3.

Rear mount 24 is connected to base 12 by means of a slidable connection. The function of the slidable connection is to permit rear mount 24 to be moved along the length of base 12 to accommodate bicycles of varying lengths. In the preferred embodiment, the slidable connection is implemented by attaching the bottom of rear mount 24, by means of a channel connector 30, to a bar 26, which extends along the part of the length of base 12. Bar 26 may be recessed within a slot in base 12. Channel connector 30 fits around bar 26 and permits connector 30 to slide up and down bar 26. A screw 32 extending through connector 30 and touching bar 26 may be tightened to secure connector 30 to bar 26 at any desired position along bar 12. Thus, when using case 10, rear mount 24 may be slid closer to or farther away from front mount 22 so that the distance between them is selected according to the size of the bicycle.

Although FIG. 2 and other drawings, show rear mount 24 as having a slidable connection with base 12, the invention would be equally functional if front mount 22 rather than rear mount 24 were slidably connected. Such a slidable connection of front mount 22 could be made in the same manner as with rear mount 24, as discussed above.

Another feature of the invention is that the angled configuration of front mount 22 permits another means for adjusting the distance between front mount 22 and rear mount 24 to accommodate varying sizes of bicycles. An attachment means of front mount 22 to base 12 may permit front mount 22 to be rotated one-hundred-eighty degrees so that the angle between front mount 22 and base 12 is reversed. This permits the relative distance of front mount 22 with respect to rear mount 24 to be further capable of adjustment.

Frame 20 is connected to the rear of base 12. The function of frame 20 is to provide rigid side members spaced on both sides of case 10 to protect the bicycle, especially its gears and rear derailleur equipment. Thus, frame 20 may take any shape so long as it includes at least one pair of rigid side members 21. In the preferred embodiment, each side member 21 forms an angle that extends upwardly from base 12. Side members 21 are connected to each other with a cross member 21a for additional strength and stability.

Connected to base 12 are a plurality of straps 34. Straps 34 each have a securing means for enabling connection of one end to another. A preferred method of connecting straps 34 is hook and eye fabric connectors, such as Velcro. Straps 34 are used for connecting bicycle accessories, such as a helmet or pump, within case 10.

A feature of the case 10 is that front mount 22, rear mount 24, and frame 20 have a relatively low profile with respect to base 12. This permits case 10 to be easily folded around or against base 12 when not in use.

Referring now to FIG. 3, a perspective view of the bicycle, secured within cover 11 in accordance with one embodiment of the invention, is shown. For purposes of illustration, cover 11 is transparent. FIG. 3 shows various parts of a standard bicycle, which are relevant to securing the bicycle within case 10. Although FIG. 3 shows the bicycle with its wheels 32 removed, when the bicycle is out of case 10 and assembled for use, a front fork 36 connects the front wheel to the frame, and rear drop outs 38 connect the rear wheel to the frame. The bicycle frame consists of a top tube 31, a down tube 33, a seat tube 35. The bicycle handlebars are generally designated as 39.

The front portion of the bicycle frame is generally that portion including front fork 36 and down tube 33, whereas the rear portion generally includes rear drop outs 38 and seat tube 35. The mid portion is generally the area between down tube 33 and seat tube 35, including the area of their junction near the bicycle pedals (not shown).

In the embodiment of FIG. 3, the bicycle is secured within case 10 with its wheels 32 removed. Front fork 36 is attached to front mount 22 by means of a quick release mechanism 23. Likewise, rear drop outs 38 are attached to rear mount 24 by means of quick release 25. Again, this is only one embodiment, and certain features of case 10, such as frame 20 and the slidable engagement of front mount 22 or rear mount 24, could be used advantageously with a bicycle having its wheels in place. Although not visible in FIG. 3, neither the bicycle seat nor the pedals need be removed when case 10 is in use.

Figure 4:
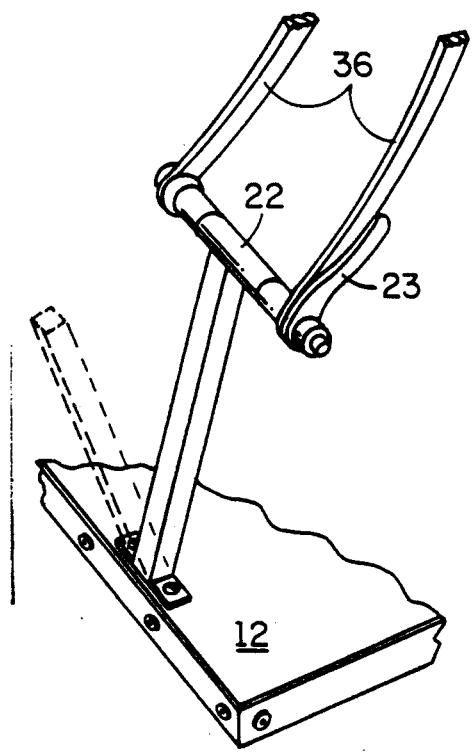
FIG. 4 is a perspective view of the front mount of FIG. 2, with the front fork of a bicycle attached thereto.

FIG. 4 is a perspective view showing the attachment of front fork 36 to front mount 22, using quick release 23, in further detail. FIG. 4 also illustrates the alternative position of front mount 22 when rotated as discussed above.

Figure 5:
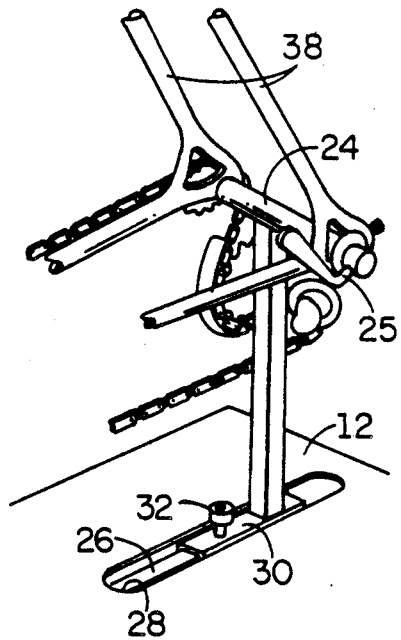
FIG. 5 is a perspective view of the rear mount of FIG. 2, with the rear drop outs attached thereto, and further showing a slidable engagement between the rear mount and the base.

FIG. 5 is a perspective view showing the attachment of rear drop outs 38 to rear mount 24, using quick release 25, in further detail. FIG. 5 also illustrates a slidable connection between rear mount 24 and base 12.

Figure 6:
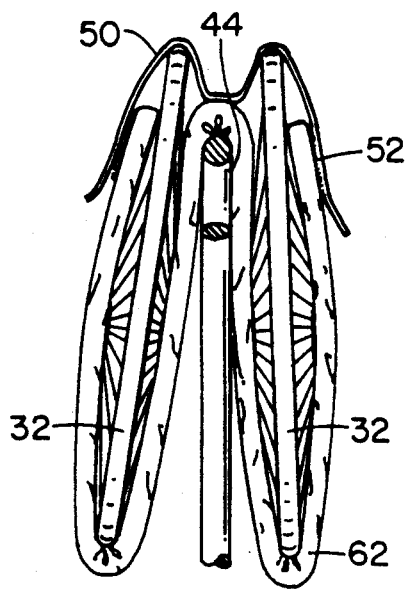
FIG. 6 is a partial cross sectional view of the bicycle of FIG. 3, showing the wheel pad, containing the wheels and draped across the top tube of the bicycle.

FIG. 6 is a cross sectional view of part of the bicycle of FIG. 3, together with a wheel pad 62, which is used with one embodiment of the invention, i.e., when the wheels of the bicycle are removed. Wheel pad 62 is used to wrap wheels 32 after they have been removed. Wheel pad 62 is generally rectangular in shape having a length equal to approximately four times the diameter of each wheel 32 and a width approximately equal to the diameter of each wheel 32. Alternatively, wheel pad 62 could be in the shape of a number of circles, each approximately the size of the bicycle wheel. The primary consideration is that wheel pad 62 be of sufficient size and shape to wrap the wheels. Wheel pad 62 has a securing strap 64 for securing the wheels 32 in wheel pad 62. Wheel pad 62 is filled with a padding material, such as foam rubber.

Once the wheels are secured within wheel pad 62, wheel pad 62 is placed along the mid portion of the bicycle frame, preferably by being straddled over top tube 31 of the bicycle with one wheel on each side of the bicycle frame. The use of wheel pad 62 to wrap wheels 32 for placement against the frame of the bicycle serves the dual purpose of protecting both the wheels and the bicycle. The wheel pad 62, when so used, also adds body to the case 10 so that the widest portions of the bicycle, handlebars 39 and pedals (not shown), do not bulge outward from the rest of the case 10.

Figure 7:
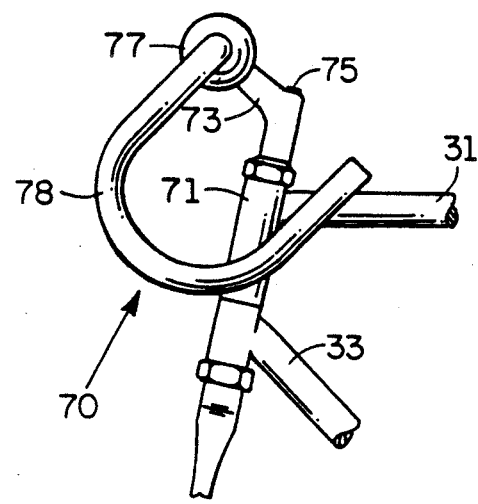
FIG. 7 is a side view of bicycle handlebars in a downwardly rotated position for use with the invention.

FIG. 7 is a side view of a portion of the bicycle, especially handlebars 70. Generally, handlebars 70 are attached to the bicycle near the junction of top tube 31 and down tube 33. A collar 71 receives a stem 73 of the handlebars 70. As indicated in FIG. 7, two adjustment means permit handlebars 70 to be rotated and raised or lowered to suit the size of the user. Specifically, a height adjustment bolt 75 may be tightened and loosened to permit stem 73 to slide within collar 71 so that handlebars 70 may be raised or lowered with respect to the rest of the bicycle frame. A binder bolt 77 may also be tightened or loosened to permit the handpiece 78 of handlebars 70 to be rotated. In FIG. 7, in which only one handpiece 78 is in view, the handpieces 78 are rotated down as would be appropriate for preparing the bicycle to be placed within case 10. The rotating of the handlebars 70 permits case 10 to be more compact by moving the handlebar brake hoods, such as are shown in FIG. 3, downward.

The configuration of FIG. 7 is an alternative to the configuration shown in FIG. 3, which uses a stem interface 81 to connect handlebars 39 to the frame when the bicycle is placed within case 10. Actually, in FIG. 3, handlebars 39 are different from handlebars 70 of FIG. 7. Whereas handlebars 70 of FIG. 7 are presently a standard form of handlebars, handlebars in the shape of handlebars 39 are increasing in popularity. Unlike handlebars 70, stem 89 of handlebars 39 is angled. Handlebars 39 are not easily rotated downward as are handlebars 70. FIG. 3 uses a special interface stem 81, which is used to accommodate this configuration of handlebars 39.

Figure 8A:
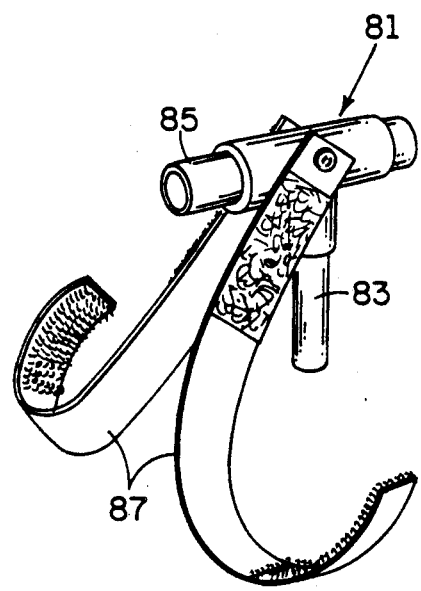
FIG. 8a is a perspective view of an interface stem used to connect the frame of the bicycle to the handlebars.

FIG. 8a is a perspective view of interface stem 81. Although interface 81 is pictured with a T-shape, an L-shaped stem would be equally functional. Interface stem 81 has two receiving ends: a frame receiving end 83 and a handlebar receiving end 85, which are generally orthogonal to each other. Interface stem 81 also has straps 87, which may be wrapped around handlebars 39 to further secure handlebars 39 during transport.

Figure 8B:
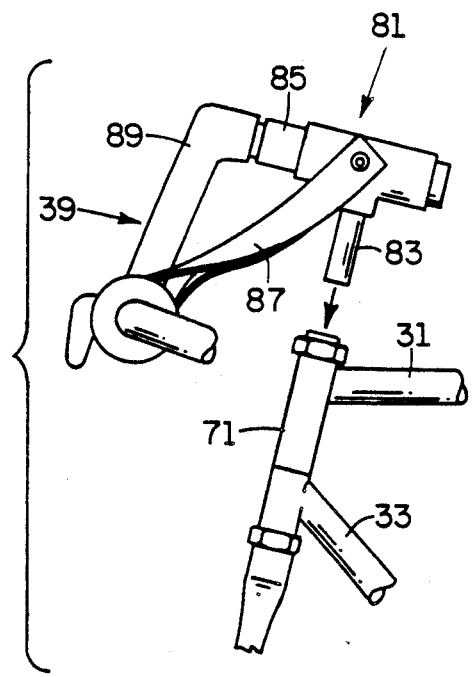
FIG. 8b is a side view of the interface stem of FIG. 8a and a portion of the frame of a bicycle.

FIG. 8b shows interface stem 81 used to attach handlebars 39 to a bicycle frame. Comparing FIG. 8b to FIG. 7, it is seen that rather than rotating handlebars 70, handlebars 39 are first removed from the bicycle frame and interface stem 81 is inserted into the frame in a similar manner as handlebars 39 would be, using frame receiving end 83. Handlebars 39 are then attached to the handlebar receiving end 85 of interface stem 81, using handlebar stem 89. Once handlebars 39 have been inserted into interface stem 81, straps 87 are wrapped around handlebars 39 to keep them in place.

A further advantage of interface stem 81 is that it may optionally be used with standard handlebars, such as shown in FIG. 7, if the user does not wish to rotate the handlebars. When so using interface stem 81, the handlebars are in a downward position and no further adjustment is needed to fit the bicycle within the case 10. This provides an easily reassembled bicycle. The practicality of using interface stem 81 in this manner arises from the fact that binder bolt 77 may be fragile and subject to deterioration with repeated tightening and untightening.

Although not shown in the drawings, an enhancement of the invention is the use of front mount 22 or rear mount 24 as shock absorption means. This could be easily accomplished by modifying the vertical portion of front mount 22 or rear mount 24 so that the vertical portion comprises a sleeve and column, in slidable engagement, such that either the sleeve or the column is a sliding member. A large spring means, such as a coil spring or some other elastic device, placed within the column and sleeve could then provide a rest for the sliding member, permitting the sliding member to move if force is exerted on case 10, but providing a stop. Such force is transmitted to the mount and absorbed by the spring means, thereby preventing stress on the bicycle.

In summary, a bicycle transport case has been described that features the use of a lightweight case capable of protecting the bicycle. The invention also minimizes the amount of assembly and disassembly necessary for using the case 10. In one embodiment, it is only necessary to remove the wheels and adjust the handlebars.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

I claim:

1. A case for transporting a bicycle, comprising:
   a base;
   a pair of mounts connected to said base for attaching front and rear portions of said bicycle respectively, wherein at least one of said mounts is moveable on said base to permit the distance between said mounts to be varied;
   a flexible cover attached to said base for containing the bicycle;
   a frame connected to said base for protecting the gears of said bicycle; and
   a wheel pad for wrapping the wheels of said bicycle, said wheel pad being of a size and shape such that said wheel pad containing said wheels may be placed against the frame of said bicycle when said bicycle is within said case.

2. The case of claim 1 wherein said moveable mount is slidably engaged by means of a bracket attached to the bottom of said second mount that rides on a bar attached to said base.

3. The case of claim 1, wherein said moveable mount is angled with respect to said base and is attached to said base so that said angle may be varied.

4. The case of claim 1, wherein at least one of the wheels of said bicycle is removed and wherein at least one of said mounts receives said bicycle using a wheel receiving means of said bicycle.

5. The case of claim 4, wherein said mount for receiving said removed wheel uses a quick release mechanism for attaching said removed wheel to said receiving mount.

6. The case of claim 1, wherein said top tube of said bicycle is saddled with said wheel pad containing said wrapped wheels.

7. The case of claim 1, further comprising an interface stem for connecting the handlebars of said bicycle to the frame of said bicycle in a rotated position.

8. The case of claim 1, wherein at least one of said mounts is a shock absorption means comprising a sleeve, column, and spring means.

9. The case of claim 1, wherein said frame is comprised of spaced and rigid bars projecting upwardly at each side of said base at one end.

10. The case of claim 1, wherein said flexible cover is of such size and shape so as to generally conform to the shape of said bicycle with wheels removed and handlebars rotated downward.

11. A case for transporting a bicycle having at least one wheel removed, comprising:
    a base;
    a pair of mounts connected to said base for attaching front and rear portions of said bicycle, wherein at least one of said mounts received said bicycle using a wheel receiving means of said bicycle,;
    a flexible cover attached to said base for containing the bicycle;
    a frame connected to said base for protecting the gears of said bicycle; and
    a wheel pad for wrapping the wheels of said bicycle, said wheel pad being of a size and shape such that said wheel pad containing said wheels may be placed against the frame of said bicycle when said bicycle is within said case.

12. The case of claim 11, wherein said mount receiving said removed wheel uses a quick release mechanism for attaching said removed wheel to said receiving mount.

13. The case of claim 11, wherein at least one of said mounts is moveable on said base to permit the distance between said mounts to be varied.

14. The case of claim 13, wherein said moveable mount is slidably engaged by means of a bracket attached to the bottom of said second mount that rides on a bar attached to said base.

15. The case of claim 11, wherein said frame is comprised of spaced and rigid bars projecting upwardly at each side of said base at one end.

16. The case of claim 11, wherein said flexible cover is of such size and shape so as to generally conform to the shape of said bicycle with wheels removed and handlebars rotated downward.

17. The case of claim 1, wherein said top tube of said bicycle is saddled with said wheel pad containing said wrapped wheels.

18. The case of claim 11, further comprising an interface stem for connecting the handlebars of said bicycle to the frame of said bicycle in a rotated position.

19. The case of claim 11, wherein at least one of said mounts is a shock absorption means comprising a sleeve, column, and spring means.

* * * * *